(12) United States Patent
Ben-Shalom

(10) Patent No.: US 9,593,825 B2
(45) Date of Patent: Mar. 14, 2017

(54) ILLUMINATION SYSTEM

(71) Applicant: Microscan Systems, Inc., Renton, WA (US)

(72) Inventor: Eldad Ben-Shalom, Amstelveen (NL)

(73) Assignee: Microscan Systems, Inc., Renton, WA (US)

( * ) Notice: Subject to any disclaimer, the term of this patent is extended or adjusted under 35 U.S.C. 154(b) by 0 days.

(21) Appl. No.: 14/524,370

(22) Filed: Oct. 27, 2014

(65) Prior Publication Data
US 2015/0115036 A1    Apr. 30, 2015

(51) Int. Cl.
| | |
|---|---|
| *G06K 7/10* | (2006.01) |
| *F21V 7/04* | (2006.01) |
| *G06K 7/14* | (2006.01) |
| *F21V 7/22* | (2006.01) |

(52) U.S. Cl.
CPC ............... *F21V 7/04* (2013.01); *F21V 7/22* (2013.01); *G06K 7/10742* (2013.01); *G06K 7/14* (2013.01); *F21Y 2113/10* (2016.08); *G06K 2007/10485* (2013.01)

(58) Field of Classification Search
CPC ..... G06K 2007/10485; G06K 7/10742; G06K 7/14
USPC ........................................... 235/454, 462.42
See application file for complete search history.

(56) References Cited

U.S. PATENT DOCUMENTS

| | | | | |
|---|---|---|---|---|
| 4,194,809 | A  * | 3/1980 | Campagna, Jr. | 359/520 |
| 4,831,437 | A  * | 5/1989 | Nishioka et al. | 348/71 |
| 6,345,763 | B1 * | 2/2002 | Matsuda et al. | 235/459 |
| 7,771,056 | B2 * | 8/2010 | Kimura et al. | 353/98 |
| 2003/0038295 | A1 | 2/2003 | Koda | |
| 2006/0227557 | A1* | 10/2006 | Li | 362/341 |
| 2006/0245746 | A1 | 11/2006 | Makii | |
| 2011/0200319 | A1 | 8/2011 | Kravitz et al. | |
| 2012/0092859 | A1 | 4/2012 | Gregoris | |

FOREIGN PATENT DOCUMENTS

EP    0 940 627 A1    9/1999

OTHER PUBLICATIONS

PCT/US2014/062814—International Search Report and Written Opinion, mailed Jan. 27, 2015, 13 pages.
PCT/US2014/062814—International Preliminary Search on Patentability, mailed May 12, 2016, 10 pages.

* cited by examiner

*Primary Examiner* — Seung Lee
(74) *Attorney, Agent, or Firm* — Blakely Sokoloff Taylor & Zafman LLP

(57) ABSTRACT

Implementations of an apparatus including a housing having therein at least one light source, the at least one light source oriented to direct light out one side of the housing, and an arc-shaped reflector connected to the housing, the arc-shaped reflector having a reflecting surface optically coupled to the at least one light source to reflect light from the at least one light source to a position adjacent to the housing.

25 Claims, 6 Drawing Sheets

ILLUMINATION SYSTEM

CROSS-REFERENCE TO RELATED APPLICATIONS

This utility application claims priority under 35 U.S.C. §119(e) to U.S. Provisional Application No. 61/897,140, filed 29 Oct. 2013. The contents of the priority provisional application are hereby incorporated by reference in their entirety.

TECHNICAL FIELD

The disclosed embodiments relate generally to illumination and in particular, but not exclusively, to illuminators that can be used in imaging systems.

BACKGROUND

Optical imaging systems have become an important and ubiquitous tool in tracking many different types of items and machine-vision systems have become an important tool for tasks such as part identification and inspection. Both imaging systems capture a two-dimensional digital image of the optical symbol (in the case of an optical data-reading system) or the part (in the case of a general machine-vision system) and then proceed to analyze that image to extract the information contained in the image. One difficulty that has emerged is that of ensuring that the camera acquires an accurate image of the object; if the camera cannot capture an accurate image of the object, the camera can be unable to decode or analyze the image, or can have difficulty doing so.

One of the difficulties in acquiring an accurate image is ensuring that the object being imaged is properly illuminated. Problems can arise whenever the lighting is of the wrong type or suffers from problems such as non-uniformity. Illuminators exist to provide lighting for optical data-reading systems and machine vision systems, but these have some known shortcomings. Existing illuminators are often round, making them larger than needed and difficult to manufacture. The round shape also makes their lighting pattern a different shape than the field of view of the imager, which can lead to non-uniform lighting, especially near the edges of the image. Other types of existing illuminators can reduce some of these shortcomings, but none overcomes most or all of them.

BRIEF DESCRIPTION OF THE DRAWINGS

Non-limiting and non-exhaustive embodiments of the present invention are described with reference to the following figures, wherein like reference numerals refer to like parts throughout the various views unless otherwise specified.

DETAILED DESCRIPTION OF THE ILLUSTRATED EMBODIMENTS

Embodiments are described of an apparatus, system and method for illumination. Specific details are described to provide a thorough understanding of the embodiments, but one skilled in the relevant art will recognize that the invention can be practiced without one or more of the described details, or with other methods, components, materials, etc. In some instances, well-known structures, materials, or operations are not shown or described in detail but are nonetheless encompassed within the scope of the invention.

Reference throughout this specification to "one embodiment" or "an embodiment" means that a particular feature, structure, or characteristic described in connection with the embodiment is included in at least one described embodiment. Thus, appearances of "in one embodiment" or "in an embodiment" in this specification do not necessarily all refer to the same embodiment. Furthermore, the particular features, structures, or characteristics described can be combined in any suitable manner in one or more embodiments.

Figure 1:
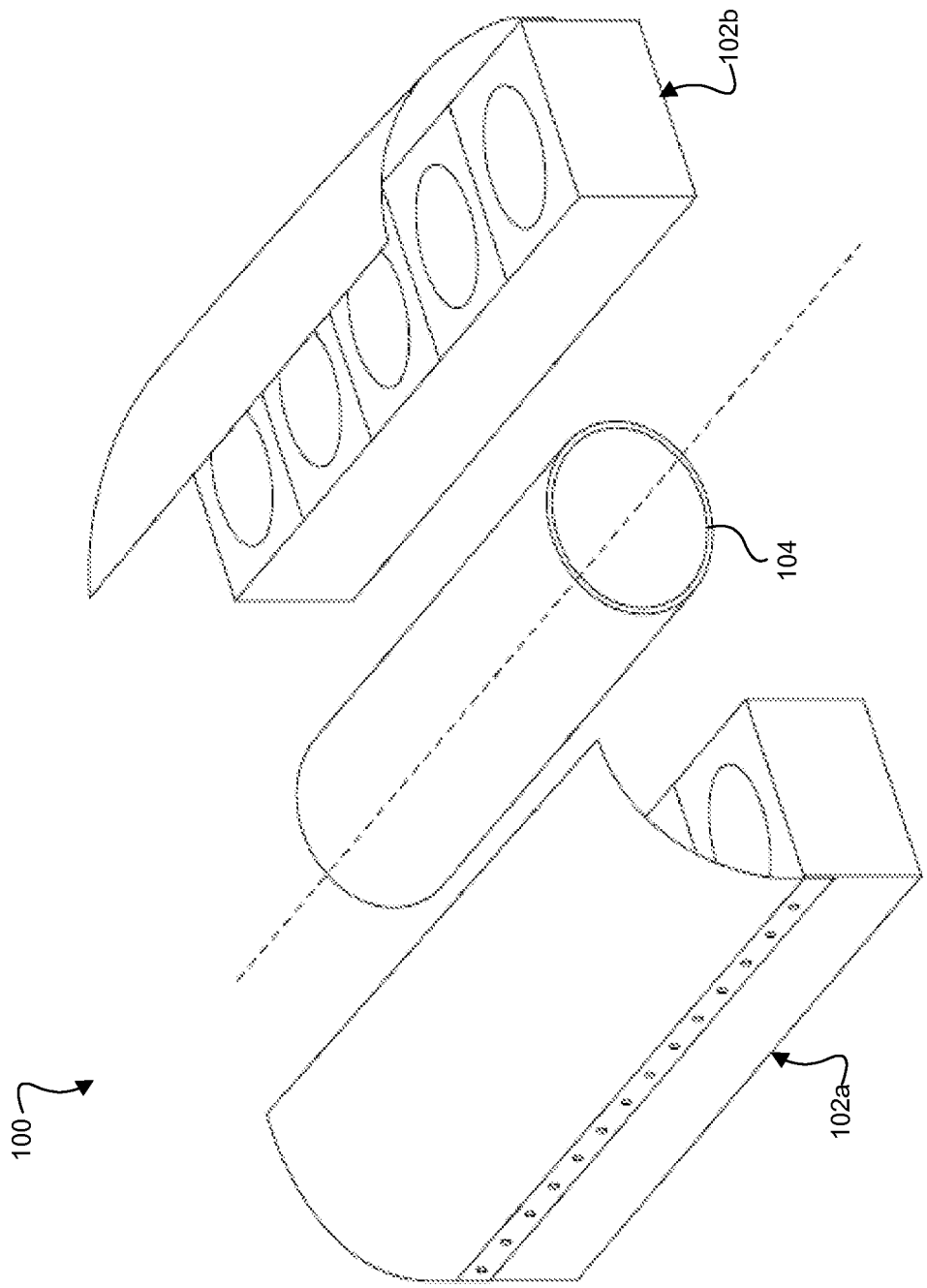
FIG. 1 is a perspective view of an embodiment of an illumination system.

FIG. 1 illustrates an embodiment of an illumination system 100 that can be used, for example, with a machine-vision system, a bar code or matrix code reading system, or another kind of imaging system. Illumination system 100 includes a pair of illuminators 102a and 102b spaced apart from each other and positioned substantially parallel to each other on either side of an object 104 to be illuminated. Object 104 can be illuminated with only one illuminator or with both illuminators, or can be illuminated sequentially with a single illuminator or with one illuminator and then the other. Moreover, the intensity of light from each illuminator 102a-102b can be varied so that each illuminator provides light at a different intensity. In the illustrated embodiment, illuminated object 104 is substantially cylindrical, but in other embodiments object 104 can have any shape and need not be cylindrical.

Figure 2:
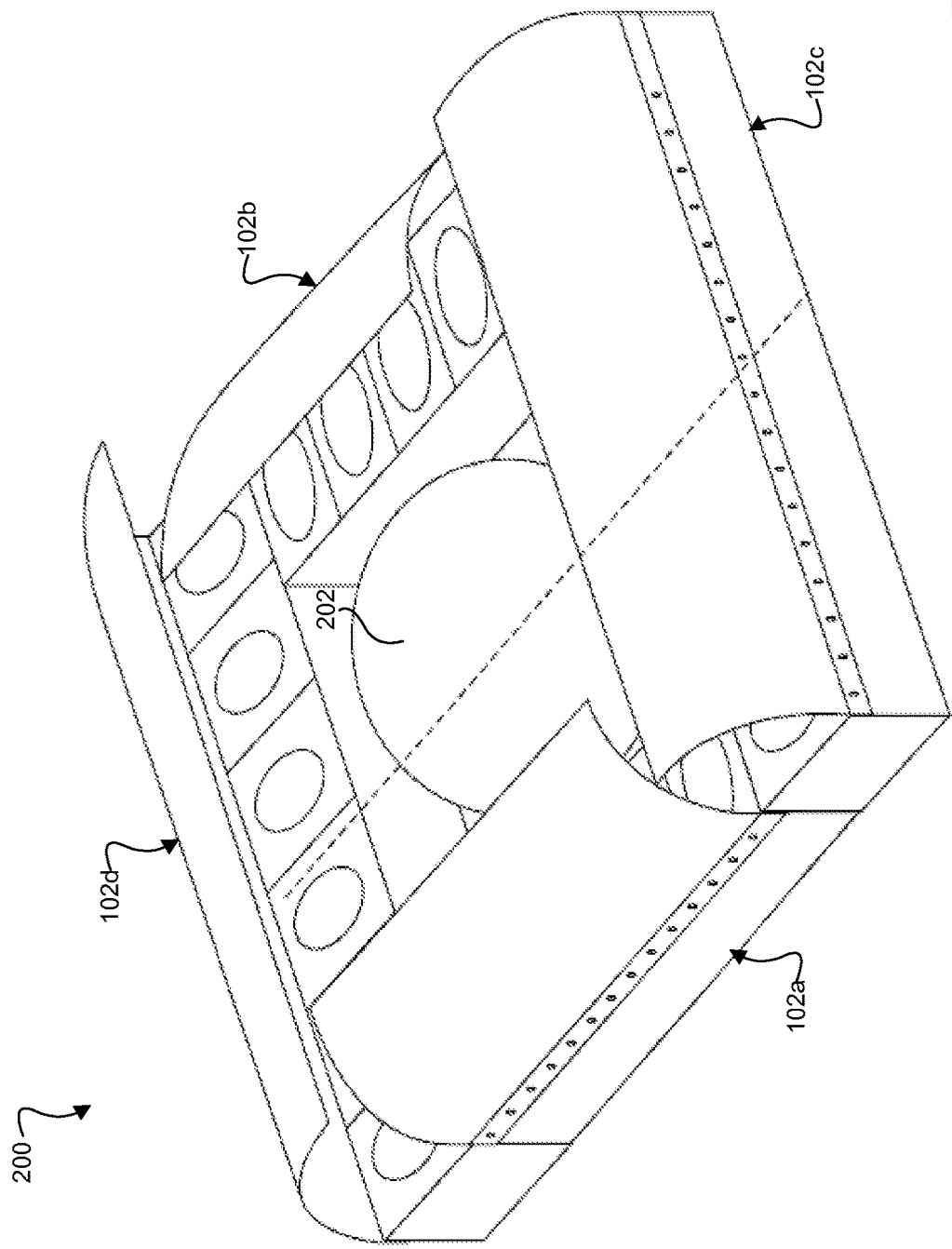
FIG. 2 is a perspective view of another embodiment of an illumination system.

FIG. 2 illustrates another embodiment of an illumination system 200 that can also be used, for example, with a machine-vision system, a bar code or matrix code reading system, or another kind of imaging system. Illumination system 200 is in most respects similar to illumination system 100. The primary difference is that illumination system 200 uses four illuminators 102a-102d instead of two. In the illustrated embodiment, each illuminator 102a-102d abuts two neighboring illuminators, such that the four illuminators form a closed rectangle around object 202 and substantially surround the object. In other embodiments, the spacing and positions of illuminators 102a-102d relative to each other and to object 202 can be different, so that the illuminators need not abut each other to form a closed rectangle around object 202. Although the illustrated embodiment has four illuminators, other embodiments can use more or less illuminators, and the illuminators can be positioned differently in different embodiments. In the illustrated embodiment, illuminated object 202 is substantially spherical, but in other embodiments object 202 can have any shape and need not be substantially spherical.

As in system 100, in system 200 different combinations of illuminators 102a-102d can be used to illuminate object 104. The object can be illuminated with all four illuminators or with less than all four illuminators. For example, object 104 can be illuminated with any one, any two, or any three of illuminators 102a-102d. As in illumination system 100, in illumination system 200 the intensity of the light from each illuminator 102a-102d can be controlled, so that all the illuminators need not illuminate object 104 with the same intensity. Moreover, illuminators 102a-102d can be sequenced in time, so that object 104 can be illuminated sequentially from two or more different directions using different sequences of one, two, three or four illuminators.

Figure 3A:
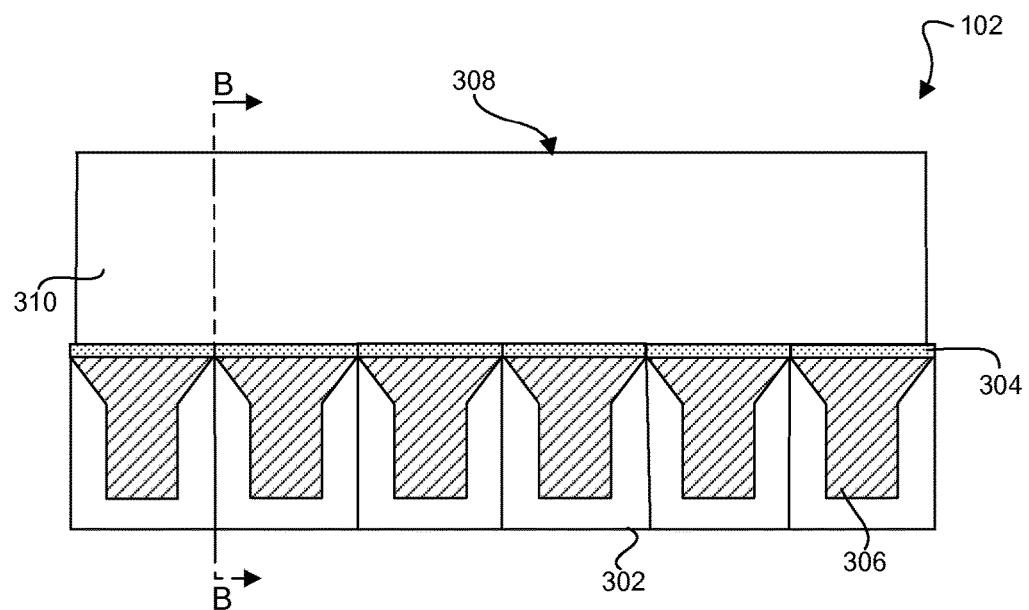
FIG. 3A is a front elevation view of an embodiment of an illuminator that can be used in the illumination systems of FIGS. 1 and/or 2.
Figure 3B:
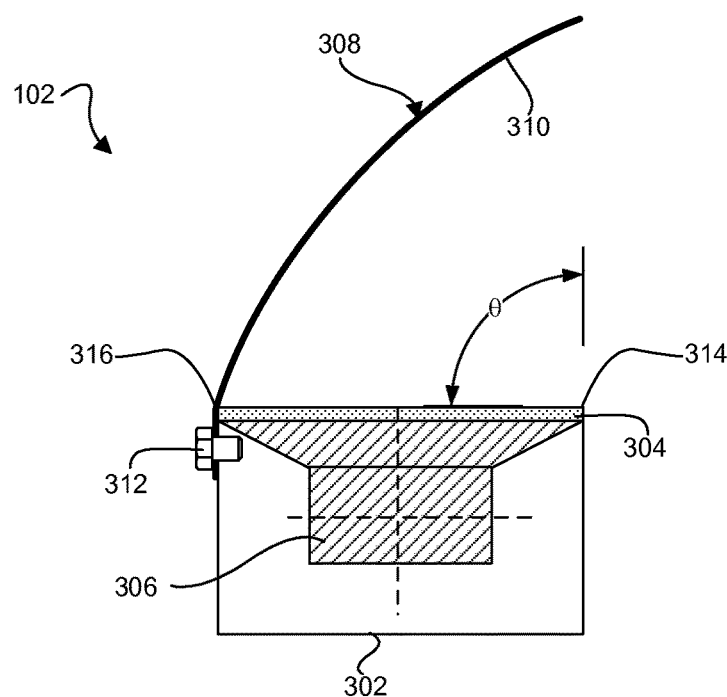
FIG. 3B is a cross-sectional view of the illuminator of FIG. 3A, taken substantially along section line B-B.

FIGS. 3A-3B illustrate details of an embodiment of illuminator 102; FIG. 3A is a front elevation, while FIG. 3B is a cross-section taken substantially along section line B-B. The primary components of illuminator 102 includes a housing 302, one or more light sources 306 positioned in the housing, and a reflector 308 attached to the housing. Housing 302 is generally a rectangular box-shaped container capable of holding at least one light source 306 in the proper orientation. Light sources 306 are positioned within housing 302 to direct light output of the top of the housing and toward the reflector 308. A cover 304 can be positioned over the top of housing 306 so that light emitted by light sources 306 travels through cover 304. In one embodiment cover 304 can be transparent, but in other embodiments cover 304 can be translucent so that it can diffuse light from light sources 306. In another embodiment cover 304 can be colorless or can have specified color, so that with a colorless cover light exiting cover 304 is the same color (i.e., same wavelength composition) as the light emitted by the light sources, while for a colored cover the light exiting cover 304 is the specified color. In still other embodiments, top cover 304 can include optical elements having optical power, for example to converge, diverge, or collimate light from light sources 306. Other embodiments of illuminator 102 can omit top cover 304 completely.

Light sources 306 are positioned within housing 302 such that they direct light toward reflector 308. The illustrated embodiment shows six light sources within housing 302, but other embodiments are not limited to the illustrated number of light sources and can have more or less light sources than shown. In one embodiment, light sources 306 are light emitting diodes (LEDs), but in other embodiments light sources 306 can be other types of lights, for example incandescent bulbs, halogen bulbs, fluorescent bulbs, and so on. In one embodiment, light sources 306 emit white or colorless light (i.e., light including several wavelengths comprising multiple colors), but in other embodiments light sources 306 can emit light of a specific color, such as red or green. In still other embodiments, light sources 306 can emit at non-visible wavelengths, such as infrared or ultraviolet.

Reflector 308 is attached to the exterior of housing 302 along one side of the housing. The reflector can be made of any material that can be formed or bent to the desired shape and that will hold the desired shape once formed; metal and plastics are examples of materials that can be used for reflector 308. In one embodiment, reflector 308 is attached to housing 302 with a fastener 312, but in other embodiments reflector 308 can be attached to the housing with adhesive, can be integrally formed with the housing, or can be optically coupled to light sources 306 by some other means. Reflector 308 is arc-shaped and forms an arc that extends from where the reflector is attached to the housing to a position above light sources 306. In the illustrated embodiment reflector 308 is shaped like a parabolic arc, but in other embodiments it can have other shapes such as a circular arc, a hyperbolic arc, a skewed parabolic arc, an arc defined by a polynomial function, an arc defined by an exponential function, an arc defined by a logarithmic function, an arc defined by a spline, and so on. In still other embodiments, reflector 308 can be planar or can include multiple planar facets. Generally, the shape of the reflector can be adjusted to give the necessary optical characteristics, such as uniformity and brightness, to the illumination light. In the illustrated embodiment, reflector 308 subtends an angle $\theta$ of substantially 90 degrees between edges 314 and 316 of housing 302, but in other embodiments angle $\theta$ can be less than or greater than 90 degrees. In various embodiments, for example, angle $\theta$ can range from substantially zero degrees to substantially 270 degrees.

Reflector 308 includes a reflecting surface 310 on which light from light sources 306 is incident. In one embodiment, reflecting surface 310 can be specular and highly reflective, so that it reflects substantially all the incident light in a specular way; for example, if reflector 308 is made of metal, reflecting surface 310 can be highly polished so that it provides a specular reflection surface. Moreover, in an embodiment where reflecting surface 310 is specular, it can be coated with colored material, such as a transparent adhesive film, so that the specularly-reflected light will have the color of the colored material. In other embodiments, reflecting surface 310 can be either brushed to make its surface non-specular (i.e., diffuse) or coated with a material that makes the surface non-specular and will cause the surface to both reflect and diffuse incident light from light sources 306. For example, reflecting surface 310 can be painted with white or off-white paint, or can have some kind of white coating such as an adhesive film adhered to it. In embodiments where reflecting surface 310 is treated so that it diffuses light, the treatment can also be colored, so that the diffuse light reflected by the reflecting surface 310 will have a color.

Figure 4:
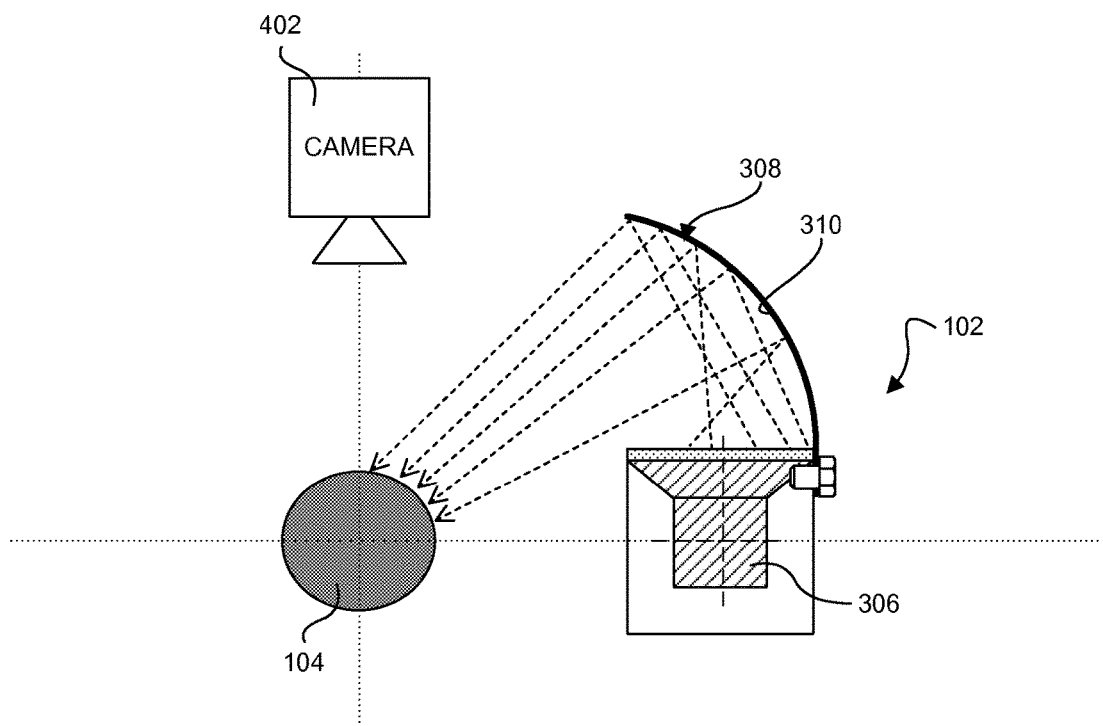
FIG. 4 is a cross-sectional view of the illuminator shown in FIGS. 3A-3B illustrating an embodiment of its operation.

FIG. 4 illustrates an embodiment of the operation of illuminator 102. In operation, light sources 306 emit light. Light emitted by light sources 306 passes through cover 304, if present, and is incident on reflecting surface 310 of reflector 308. When the incident light strike reflecting surface 310, is reflected toward object 104, such that it illuminates the surface of object 104. Once illuminated, an image of the surface of object 104 can be captured by camera 402. The nature of the reflected light from reflecting surface 310—whether it is specular or diffuse, whether it is white or colored, and so on—is determined by the treatment applied to surface 310. Reflector 308 has the advantage of "spreading" the illumination from light sources 306, so that illumination appears to be coming from multiple locations instead of from a point source or near-point source. Illuminating object 104 with reflector 308, then, lessens reflection from the surface of object 104, making it easier to obtain an image of the object's surface. Illuminator 102 can be advantageous when the surface of object 104 is reflective and/or highly polished. Illuminator 102 can be especially advantageous in high speed image capture applications, where the high speed requires a short image exposure time. The short image exposure time in turn requires bright lighting that can easily saturate the image sensor when used on highly polished or reflective objects.

Figure 5:
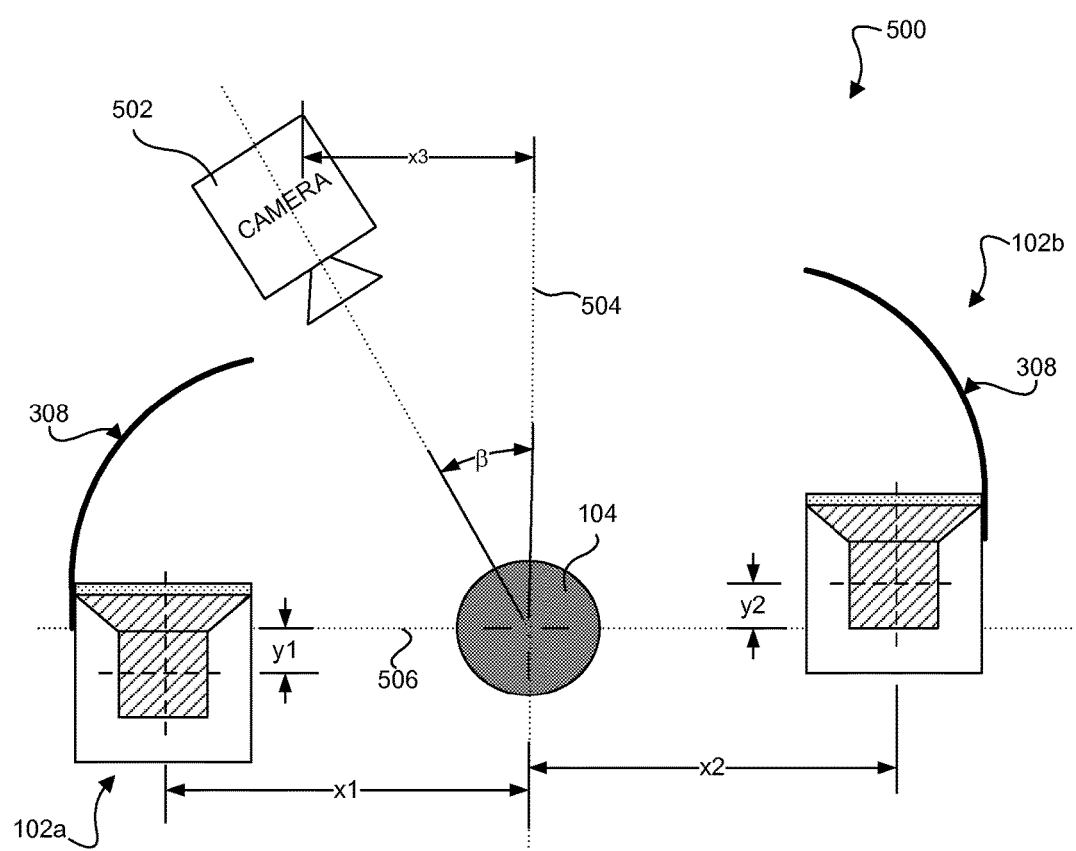
FIG. 5 is a cross-sectional view illustrating an embodiment of an imaging system.

FIG. 5 illustrates an embodiment of an imaging system 500 using the illumination system shown in FIG. 1, which has two illuminators 102a and 102b. Other embodiments of machine vision system 500 can include less more illuminators than shown (e.g., FIG. 2). In the illustrated embodiment, object 104 is positioned between illuminators 102a and 102b. Object 104 establishes a vertical reference line 504 and a horizontal reference line 506. In the illustrated embodiment, object 104 substantially cylindrical and the reference lines are its centerlines, but in other embodiments the reference lines need not be centerlines of the object and can be any datum established by the user, on or off the object.

Illuminator 102a is positioned at a lateral separation x1 from vertical reference line 504 and a vertical separation −y1 below horizontal reference line 506. Similarly, illuminator 102b is positioned at a lateral separation x2 from vertical reference line 504 and at a vertical separation +y2 above horizontal reference line 506. In one embodiment, illuminators 102a and 102b can both be positioned on the horizontal reference line 506 (i.e., y1=y2=0) and equally spaced laterally from the object (x1=x2). In other embodiments, however, illuminators 102a and 102b need not be equally spaced vertically and/or laterally—that is, y1 need not equal y2 in magnitude or sign, and similarly x1 need not equal x2 in magnitude or sign.

Camera 502 is positioned above illuminators 102a and 102b so that it captures light from one or both illuminators 102a and 102b reflected by the surface of object 104, thus capturing an image of the surface of object 104. In the illustrated embodiment, camera 502 is positioned at a distance x3 laterally from vertical reference line 504 and at an angle β relative to the vertical reference line. In other embodiments, however, distance x3 and angle β can be adjusted to any value necessary to obtain an acceptable image of object 104. For example, in one embodiment camera 502 can be substantially centered above object 104 such that x3=0 and β=0. Other embodiments can set these values differently and, moreover, x3 and angle β can be set independently—for example, x3 can be set to a given value without tilting camera 502 (e.g., x3≠0 and β=0), and similarly the camera can be rotated without translation away from the vertical reference line 504 (e.g., x3=0, β≠0).

Figure 6:
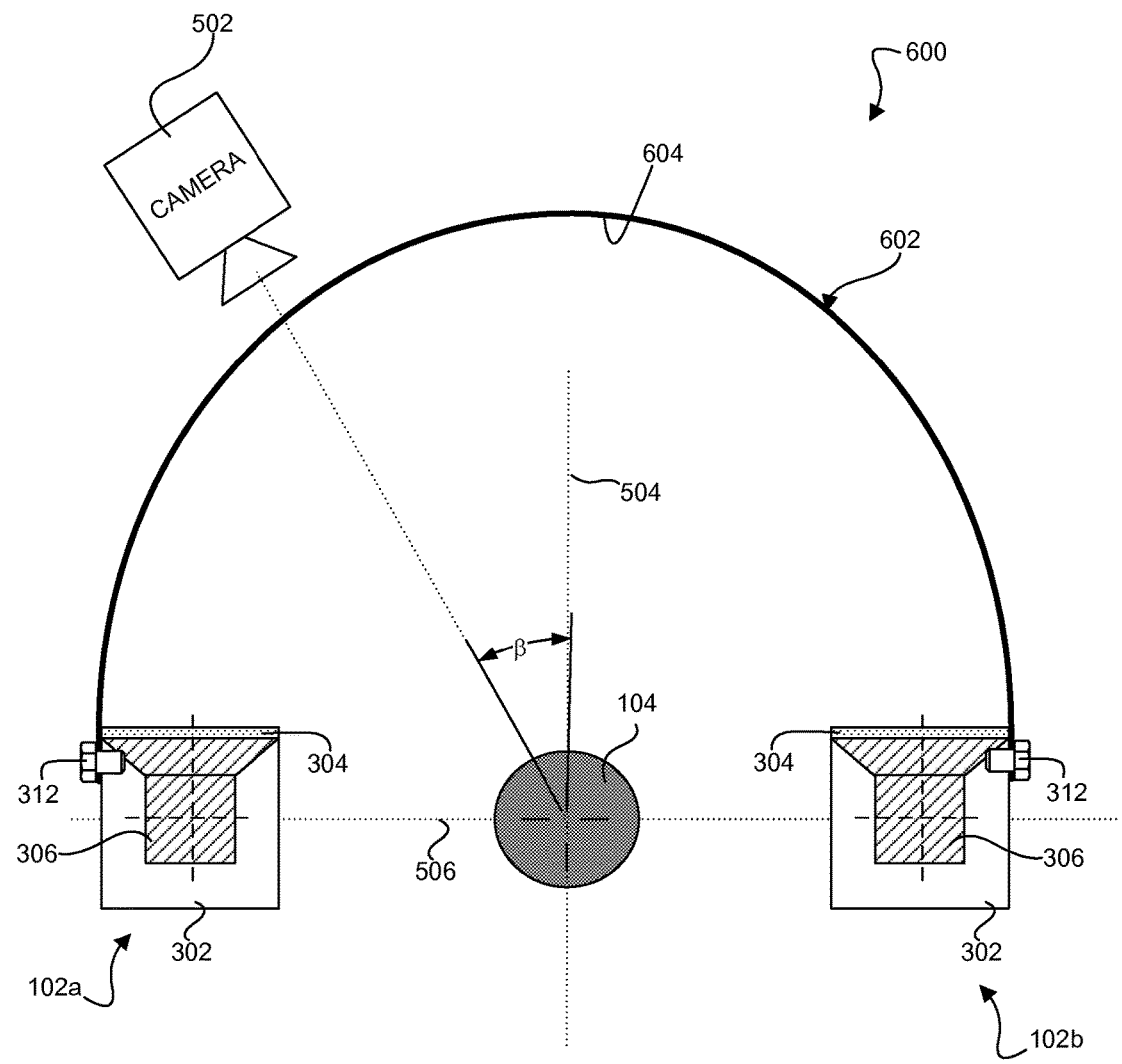
FIG. 6 is a cross-sectional view illustrating another embodiment of an imaging system.

FIG. 6 illustrates an imaging system 600 that includes another embodiment of an illuminator. Imaging system 600 is similar in most respects to imaging system 500, which includes two illuminators 102a and 102b positioned on either side of object 104. The primary difference between imaging systems 500 and 600 is that imaging system 600, instead of having separate reflectors 308, merges the separate reflectors of illuminators 102a and 102b into a single reflector 602. Reflector 602 can have any of the shapes (parabola, circular arc, a hyperbolic arc, a skewed parabolic arc, an arc defined by a polynomial function, an arc defined by an exponential function, an arc defined by a logarithmic function, an arc defined by a spline, planar, planar facets, and so on) and/or constructions described for reflector 308. Similarly to the reflectors used in imaging system 500, reflector 602 includes a reflecting surface 604 that can have any of the previously-mentioned characteristics of reflecting surface 310—it can be specular or diffuse, bare or painted/coated, colored or colorless.

Camera 502 is positioned to capture an image of the surface of object 104, but since reflector 602 is a single continuous reflector and there is no longer a space between separate reflectors to accommodate the camera, reflector 602 can include one or more holes, slots, or other openings that will allow camera 502 to view object 104 when the object is illuminated by illuminators 102a and 102b. In operation, illuminators 102a and 102b can be positioned as described for system 500.

The above description of illustrated embodiments of the invention, including what is described in the abstract, is not intended to be exhaustive or to limit the invention to the precise forms disclosed. While specific embodiments of, and examples for, the invention are described herein for illustrative purposes, various equivalent modifications are possible within the scope of the invention, as those skilled in the relevant art will recognize. These modifications can be made to the invention in light of the above detailed description.

The terms used in the following claims should not be construed to limit the invention to the specific embodiments disclosed in the specification and the claims. Rather, the scope of the invention is to be determined entirely by the following claims, which are to be construed in accordance with established doctrines of claim interpretation.

The invention claimed is:

1. An apparatus comprising:
    a housing having a plurality of light sources, the plurality of light sources oriented to direct light out one side of the housing; and
    an arc-shaped reflector connected to the housing, the arc-shaped reflector having a reflecting surface optically coupled to the plurality of light sources to reflect light from the plurality of light sources to a position adjacent to the housing.

2. The apparatus of claim 1 wherein the reflector can be a parabolic arc a circular arc, a hyperbolic arc, a skewed parabolic arc, an arc defined by a polynomial function, an arc defined by an exponential function, an arc defined by a logarithmic function, or an arc defined by a spline.

3. The apparatus of claim 1 wherein the plurality of light sources emits light of a selected color.

4. The apparatus of claim 1 wherein the reflecting surface is specular.

5. The apparatus of claim 4 wherein the reflecting surface has a specific color.

6. The apparatus of claim 1 wherein the reflecting surface is diffuse.

7. The apparatus of claim 6 wherein the reflecting surface has a specific color.

8. The apparatus of claim 1, further comprising a cover positioned over the one side of the housing through which the light sources direct light, such that light from the light sources is directed through the cover.

9. The apparatus of claim 8 wherein the cover is transparent.

10. The apparatus of claim 8 wherein the cover is translucent and diffuses the light from the plurality of light sources.

11. The apparatus of claim 8 wherein the cover has optical power.

12. A system comprising:
    an illumination system including at least one illuminator, the at least one illuminator comprising:
        a housing having a plurality of light sources, the plurality of light sources oriented to direct light out one side of the housing, and
        an arc-shaped reflector connected to the housing, the arc-shaped reflector having a reflecting surface optically coupled to the plurality of light sources to reflect light from the plurality of light sources to a position adjacent to the housing; and
    a camera positioned to capture an image of an object illuminated by the at least one illuminator.

13. The system of claim 12 wherein the reflector can be a parabolic arc a circular arc, a hyperbolic arc, a skewed parabolic arc, an arc defined by a polynomial function, an arc defined by an exponential function, an arc defined by a logarithmic function, or an arc defined by a spline.

14. The system of claim 12 wherein the plurality of light sources emits light of a selected color.

15. The system of claim 12 wherein the reflecting surface is specular.

16. The system of claim 15 wherein the reflecting surface has a specific color.

17. The system of claim 12 wherein the reflecting surface is diffuse.

18. The system of claim 17 wherein the reflecting surface has a specific color.

19. The system of claim 12 wherein the illumination system includes a plurality of illuminators oriented around an object to be illuminated.

20. The system of claim 19 wherein an illumination from the plurality of illuminators occurs sequentially in time.

21. The system of claim 12 wherein an intensity of light from the plurality of illuminators is variable.

22. The system of claim 12, further comprising a cover positioned over the one side of the housing through which the light sources direct light, such that light from the light sources is directed through the cover.

23. The system of claim 22 wherein the cover is transparent.

24. The system of claim 22 wherein the cover is translucent and diffuses the light from the plurality of light sources.

25. The system of claim 22 wherein the cover has optical power.

\* \* \* \* \*